(12) United States Patent
Williams et al.

(10) Patent No.: US 11,980,137 B2
(45) Date of Patent: May 14, 2024

(54) MOLDED PICKUP STRIPPER AND ATTACHMENT SYSTEM FOR A BALER

(71) Applicant: AGCO Corporation, Duluth, GA (US)

(72) Inventors: Nicholas H. Williams, Hesston, KS (US); Richard Alexander, Hesston, KS (US)

(73) Assignee: AGCO Corporation, Duluth, GA (US)

( * ) Notice: Subject to any disclaimer, the term of this patent is extended or adjusted under 35 U.S.C. 154(b) by 597 days.

(21) Appl. No.: 17/342,113

(22) Filed: Jun. 8, 2021

(65) Prior Publication Data

US 2021/0378179 A1 Dec. 9, 2021

Related U.S. Application Data

(60) Provisional application No. 63/036,519, filed on Jun. 9, 2020.

(51) Int. Cl.
*A01D 89/00* (2006.01)
*A01F 15/10* (2006.01)

(52) U.S. Cl.
CPC ............ *A01F 15/10* (2013.01); *A01D 89/001* (2013.01); *A01D 89/004* (2013.01)

(58) Field of Classification Search
CPC ....... A01D 89/00–89/008; A01D 57/02; A01F 15/10
See application file for complete search history.

(56) References Cited

U.S. PATENT DOCUMENTS

| | | | | |
|---|---|---|---|---|
| 1,877,519 | A | * | 9/1932 | MacGregor .......... A01D 89/002 56/364 |
| 2007/0107402 | A1 | * | 5/2007 | McClure .............. A01D 89/002 56/14.4 |
| 2009/0025358 | A1 | * | 1/2009 | Woodford ............ A01D 89/008 56/364 |
| 2009/0320434 | A1 | * | 12/2009 | Pourchet .............. A01D 89/002 56/364 |
| 2015/0230407 | A1 | * | 8/2015 | Rieter .................. A01D 89/002 56/350 |
| 2015/0366138 | A1 | * | 12/2015 | Kappelman .......... A01D 89/002 56/364 |
| 2016/0366826 | A1 | * | 12/2016 | Cox ...................... A01D 89/002 |
| 2023/0363313 | A1 | * | 11/2023 | Hoppes ................ A01D 89/008 |

FOREIGN PATENT DOCUMENTS

| | | | | |
|---|---|---|---|---|
| DE | 102017108647 | A1 | * 10/2018 | ........... A01D 89/002 |
| EP | 3763196 | A1 | * 1/2021 | ........... A01D 89/002 |

* cited by examiner

*Primary Examiner* — Thomas B Will
*Assistant Examiner* — Madeline I Runco (57) ABSTRACT

A baler pickup includes crop strippers looped around a reel. A pickup frame has upper and lower mounting stubs, wherein each of the upper mounting stubs has a notch located centrally in a forward end of the upper mounting stub. A rear end section of an upper leg of each stripper is engaged with a respective upper mounting stub and a rear end section of a lower leg is engaged with a respective lower mounting stub. A distal end of each upper leg has an outer plate separated from an inner plate so as to form a gap. The upper leg has an alignment tab such that when the leg is received on the stub, the tab engages with the notch in the stub. A gap-facing surface of the inner plate has a detent, the upper mounting stub comprises a keyhole opening formed therein rearward of the notch.

8 Claims, 8 Drawing Sheets

MOLDED PICKUP STRIPPER AND ATTACHMENT SYSTEM FOR A BALER

CROSS-REFERENCE TO RELATED APPLICATION

This application claims the benefit of the filing date of U.S. Provisional Patent Application 63/036,519, filed Jun. 9, 2020, the entire disclosure of which is incorporated herein by reference.

BACKGROUND

Field

This disclosure relates to agricultural harvesting machines such as balers and, more particularly, to a molded pickup stripper and attachment system for a harvesting machine.

Description of Related Art

Several types of agricultural hay and forage equipment include a system known as a pickup assembly, the function of which is to pick up crop lying on a field that may have been previously deposited in the form of a windrow and convey the crop to subsequent baling systems. Among the many components, pickup assemblies usually include tines that are arranged on tine carriers extending transverse to the forward direction. The tine carriers are set in motion by either rotating the tine carriers themselves or rotating a central drive shaft in which the tines are mounted. The tines extend outward through intermediate spaces that remain between strippers arranged on the frame of the pickup assembly and move along these intermediate spaces.

The plurality of strippers are attached to the pickup frame by means of screw connections or rivets. The manufacture of the pickup requires a significant expense for producing the multitude of screw connections. Since there are numerous strippers, the operation of tapping, riveting, or welding the complementary holes in the pickup frame is very costly and time intensive. The subject invention addresses the attachment and orientation/fixation problem through the molded geometry of the stripper and the pickup frame.

BRIEF OVERVIEW

In one embodiment, directed to a pickup assembly for an agricultural baler, the pickup assembly has a reel with a plurality of tines mounted at spaced locations along a length of the real, the reel being rotatably supported by a baler frame so that rotation of the reel causes a cut crop material to be moved into the baler by the pickup assembly. The pickup assembly further includes a plurality of laterally spaced U-shaped crop strippers that loop at least partially around the reel, each of the plurality of crop strippers spaced from adjacent crop strippers such that spacing between adjacent crop strippers forms slots that allow one of the plurality of tines to project outwardly between adjacent crop strippers and into operating engagement with the crop materials. Each crop stripper includes a fore-and-aft extending upper leg and a fore-and-aft extending lower leg, with forward ends of the upper and lower legs joined by an arcuate front bight. A pickup frame is rigidly connected to the baler frame and extends over at least a portion of the length of the reel. The pick-up frame has a plurality of transversely spaced and forwardly extending upper mounting stubs and a plurality of transversely spaced and forwardly and downwardly extending lower mounting stubs, wherein each of the plurality of upper mounting stubs has a notch located centrally in a forward end of the upper mounting stub. A rear end section of the upper leg of each of the crop stripper is engaged with a respective one of the upper mounting stubs of the pick-up frame and a rear end section of the lower leg is engaged with a respective one of the lower mounting stubs of the rear frame part. A distal end of each upper leg comprises an outer plate separated from an inner plate so as to form a gap therebetween, and located centrally laterally in the upper leg at a union of the outer and inner plates and extending into the gap is an alignment tab such that when the upper leg is received on the upper stub, the tab engages with the notch in the upper stub. A gap-facing surface of one of the inner plate or the outer plate has a detent extending into the gap, and the upper mounting stub comprises a keyhole opening formed therein rearward of the notch. When the upper leg is slid onto the upper mounting stub such that the tab is received in the notch to align the crop stripper, the detent engages the keyhole opening to help secure the crop stripper in place.

These and other features and advantages of this invention are described in, or are apparent from, the following detailed description of various exemplary embodiments of the systems and methods according to this invention.

BRIEF DESCRIPTION OF THE DRAWINGS

The above mentioned and other features of the disclosure will become more apparent and better understood by reference to the following description of embodiments taken in conjunction with the accompanying drawings, wherein.

FI*G. 8 is an enlarged cross section view of a portion of the stripper of FIG. 3.

Corresponding reference characters indicate corresponding parts throughout the views of the drawings.

DETAILED DESCRIPTION OF EXEMPLARY EMBODIMENTS

The embodiments will now be described in the following detailed description with reference to the drawings, wherein preferred embodiments are described in detail to enable practice of the invention. Although the disclosure is described with reference to these specific preferred embodiments, it will be understood that the disclosure is not limited to these preferred embodiments. But to the contrary, the disclosure includes numerous alternatives, modifications and equivalents as will become apparent from consideration of the following detailed description. Many of the fastening, connection, processes and other means and components utilized in this disclosure are widely known and used in the field described, and their exact nature or type is not necessary for an understanding and use of the embodiments by a person skilled in the art, and they will not therefore be discussed in significant detail. Also, any reference herein to the terms "left" or "right" are used as a matter of mere convenience, and are determined by standing at the rear of the machine facing in its normal direction of travel. Furthermore, the various components shown or described herein for any specific application can be varied or altered as anticipated by this disclosure and the practice of a specific application of any element may already by widely known or used by persons skilled in the art and each will likewise not therefore be discussed in significant detail.

Figure 1:
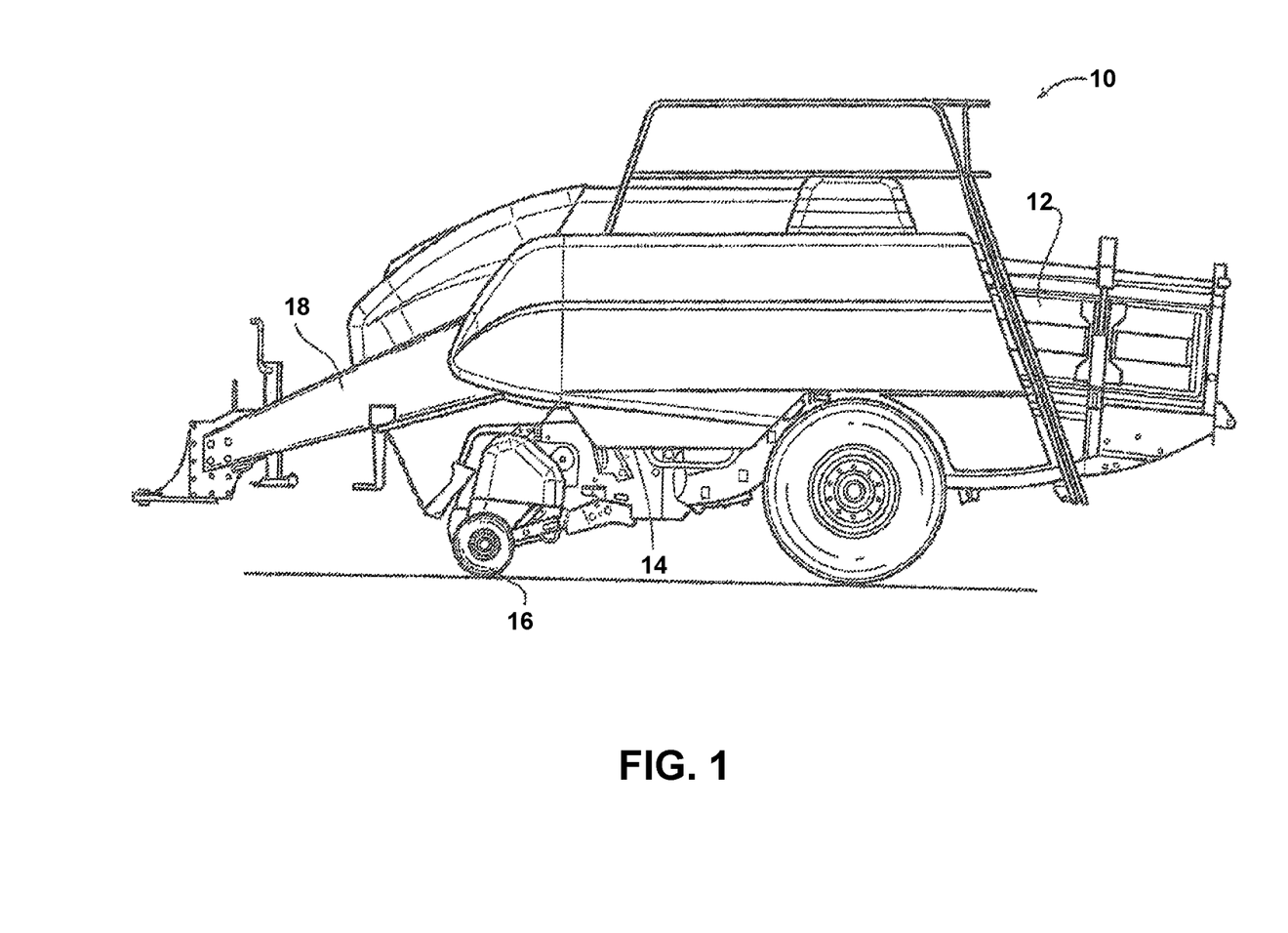
FIG. 1 is side elevation of a baler.

Turning to the figures, wherein like reference numerals represent like elements throughout the several views, FIG. 1 shows a baler 10 with a fore-and-aft extending baling chamber 12 mounted on a baler frame 14 within which bales of crop material are prepared. Crop material is collected with a pickup assembly 16 below and slightly ahead of baling chamber 12 and then loaded up into the bottom of the chamber 12. Baler 10 may be hitched to a towing vehicle (not shown), and power for operating the various mechanisms of the baler may be supplied by the towing vehicle, such as the vehicle's power takeoff shaft. While the invention will be described as part of an embodiment used with a square baler, one skilled in the art will understand that the invention may be used with other pickup assemblies mounted on other harvesting machines such as a round balers, baling presses, self-loading forage boxes, windrowers, combine-harvesters or field choppers.

Figure 2:
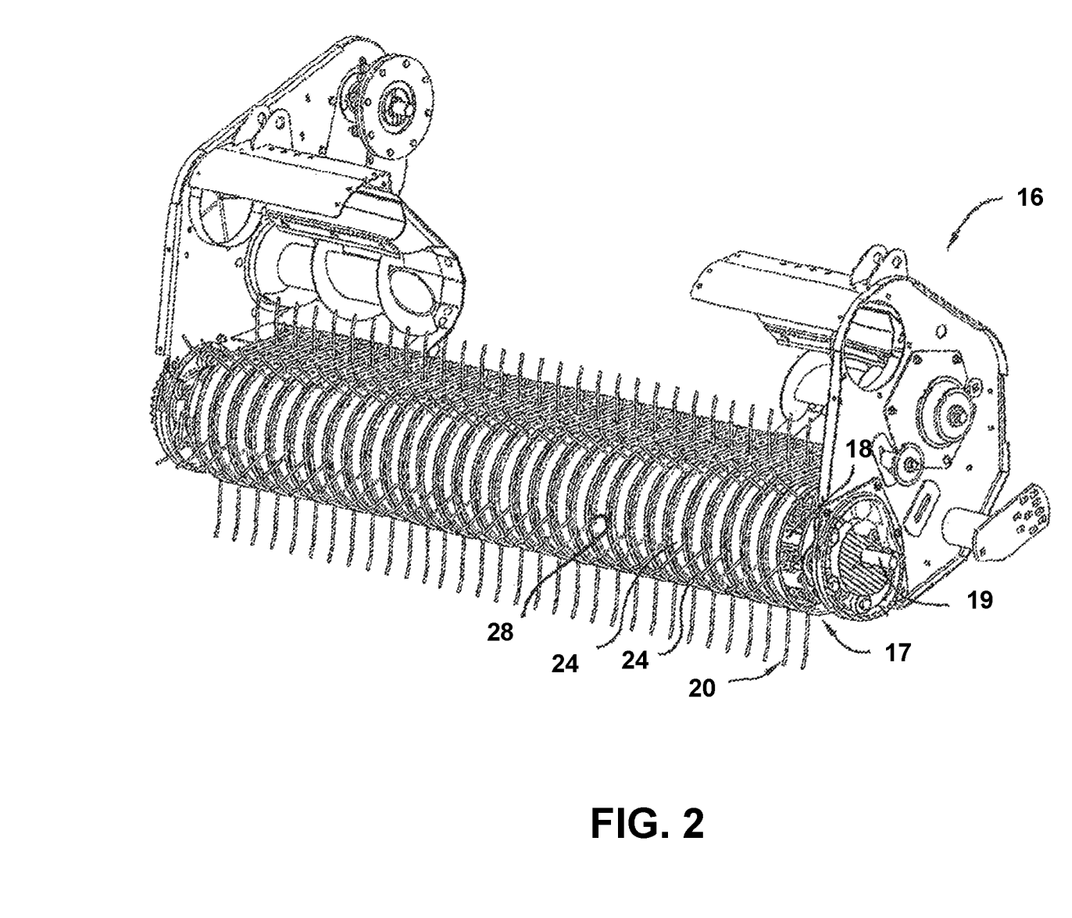
FIG. 2 is a front perspective view of a pick-up of the baler of FIG. 1.

Turning now to FIG. 2, the pickup assembly 16 includes a reel 17 having a plurality of circularly spaced, parallel, right-angle, tine support tine carriers 18 (preferably six bars) arranged in a circle about a central shaft 19. The reel 17 is rotatably supported in the frame 14 and preferably can be adjusted with respect to its height above the ground with the aid of said frame. A multiplicity of tines 20 are mounted at spaced locations along the length of each support tine carrier 18. The reel 17 rotates in a clockwise direction as viewed from the left end of pickup assembly 16 about the longitudinal axis of shaft 19. Thus, support tine carriers 18 move in a clockwise, circular path of travel as reel 17 rotates during field operations, as viewed from the left side of the machine. However, although tines 20 move in a circular path of travel with tine carriers 18, provision is made for having the outermost ends of tines 20 move in a generally downward vertical stripping or retracting action at the top of the back stretch of their path of travel. The tines 20 are then flipped back out radially along the lower half of the back stretch to prepare for the next forward sweeping movement into crop material on the ground. This is accomplished by having each tine carrier 18 oscillate about its longitudinal axis.

The pickup assembly 16 has a plurality of laterally spaced U-shaped crop strippers 24 that loop under the bottom, front, and top of reel 17 to provide a type of cover for reel 17 and support for the lifted crop materials, but the spacing between strippers 24 is such as to form slots 28 that allow tines 20 to project outwardly through the strippers and into operating engagement with the crop materials. As the tines 20 travel around the upper part of the back stretch of their path of travel, they momentarily also rotate counterclockwise so as to retract down through the slots 28 between strippers 24. As tines 20 then move along the lower half of the back stretch, they flip back out in a clockwise direction to once again project through strippers 24 along the bottom, front, and top stretches of their path of travel.

Figure 3:
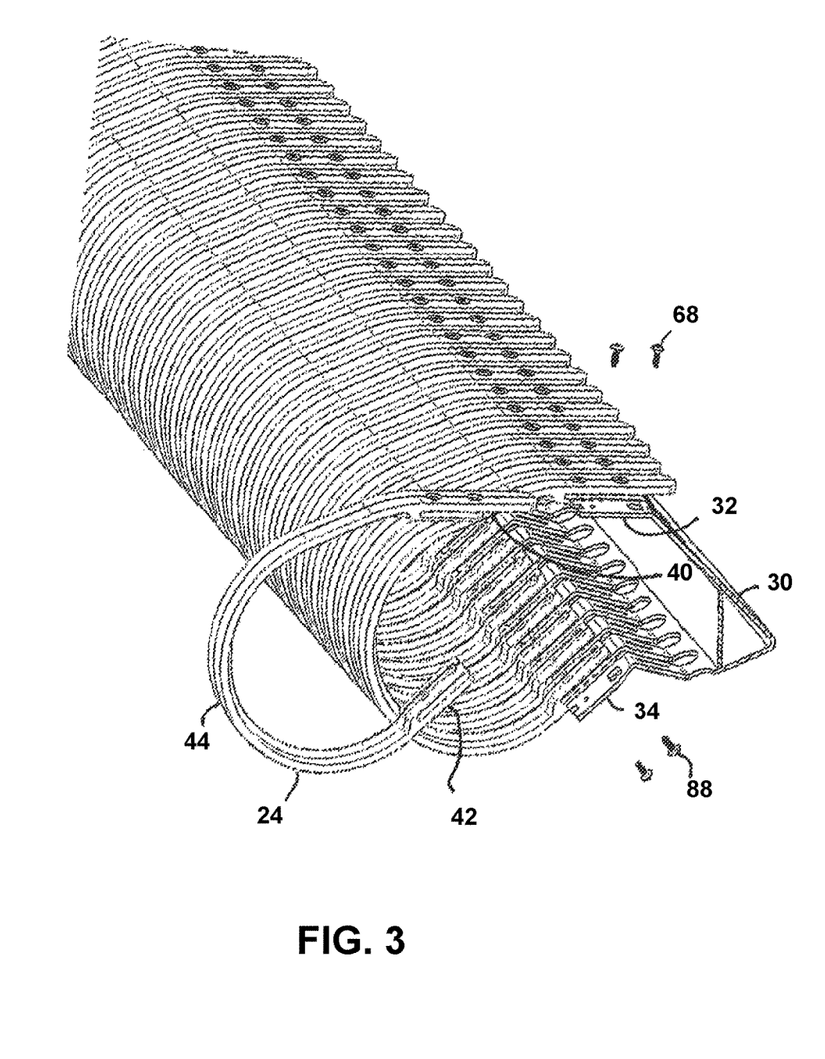
FIG. 3 is a perspective representation of a stripper for the baler in the detached state.
Figure 4:
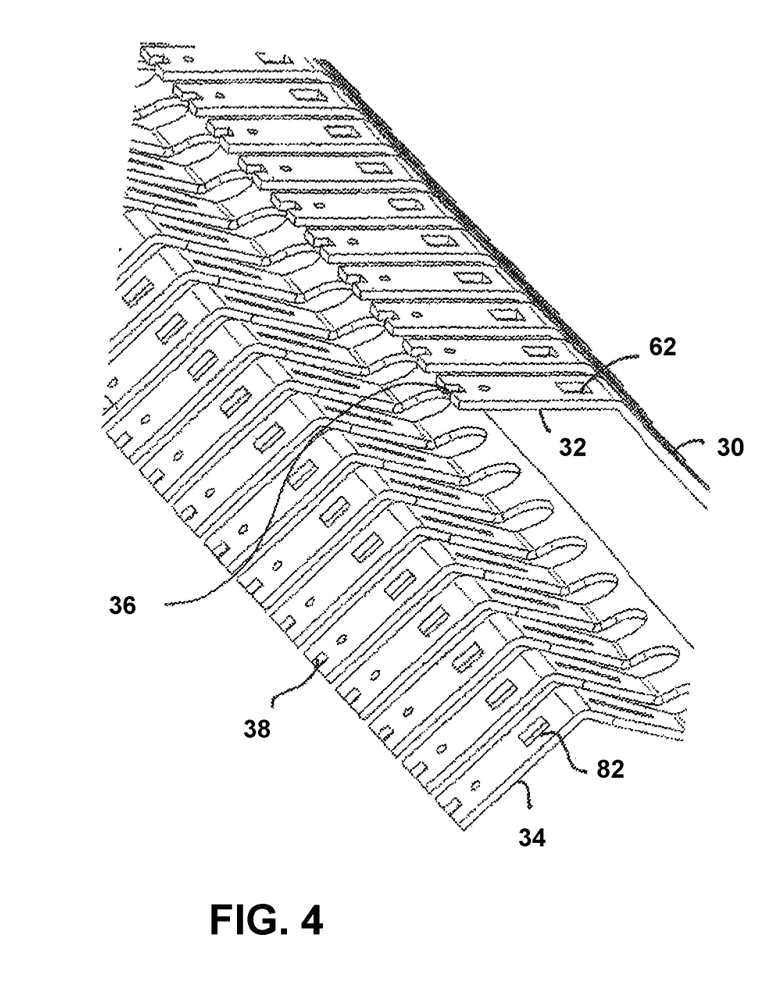
FIG. 4 is a perspective view of a portion of the pick-up frame of the stripper of FIG. 3.

FIG. 3 shows the plurality of strippers 24 are mounted on a pick-up frame 30. The pick-up frame 30 is rigidly connected to the frame 14 and forms a rear wall of an interior space containing the tine carriers 18, wherein the front side and upper and lower portions of this interior space are defined by the strippers 24. The pick-up frame 30 may extend over the width of the reel 17 or a section thereof; in the latter instance, several rear frame parts 30 are arranged laterally adjacent to one another. As perhaps best seen in FIG. 4, in the embodiment shown the pick-up frame 30 is realized in the form of one part that consists of a bent metal sheet. However, pick-up frame 30 could also consist of a multipart rear frame part that is composed of multiple individual portions. The pick-up frame 30 has a plurality of transversely spaced and forwardly extending upper mounting stubs 32 and a plurality of transversely spaced and forwardly and downwardly extending lower mounting stubs 34. Located centrally in a forward end of each upper mounting stub 32 is a notch 36, and located centrally in a forward end of each lower mounting stub 34 is a notch 38.

Each stripper 24 includes fore-and-aft extending, upper and lower legs 40 and 42, respectively, having forward ends joined by an arcuate front bight 44. A rear end section of each upper leg 40 is engaged with one of the upper mounting stubs 32 of the pick-up frame 30. A rear end section of each lower leg 42 is engaged with one of the lower mounting stubs 34 of the rear frame part 32. Desirably, the strippers 24 are made of plastic material.

Figure 5:
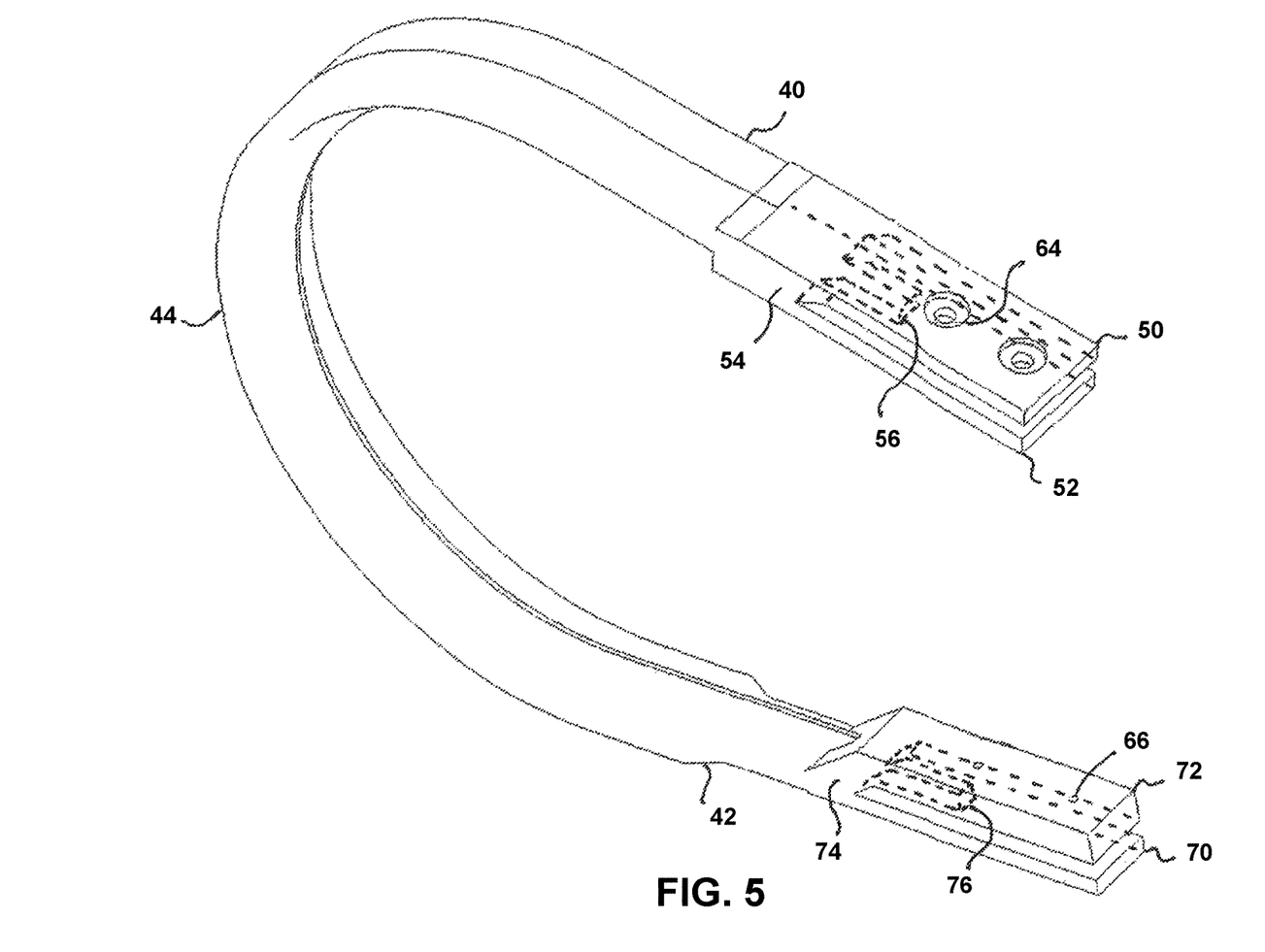
FIG. 5 is a perspective view of the stripper of FIG. 3.
Figure 6:
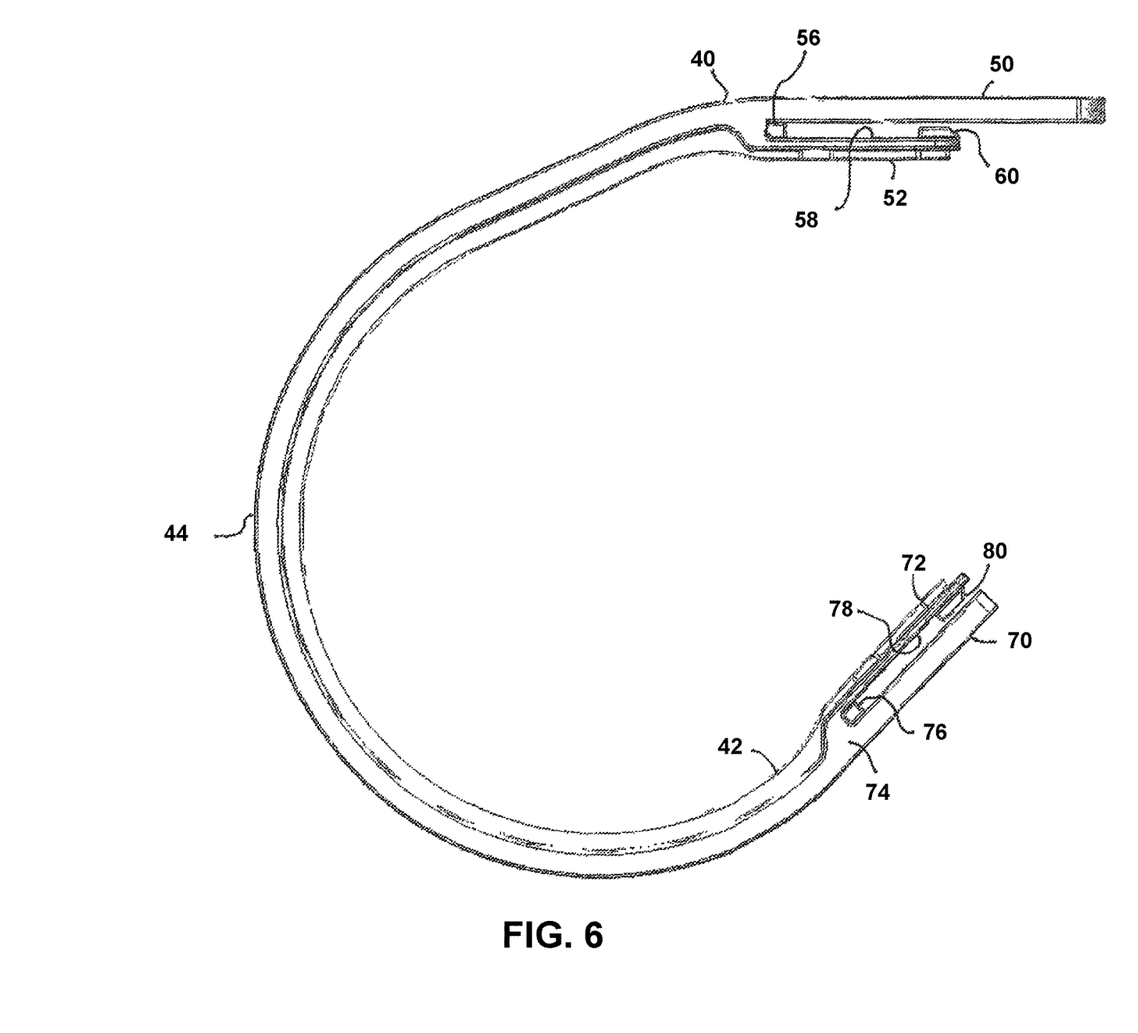
FIG. 6 is a side view of the stripper of FIG. 3.
Figure 7:
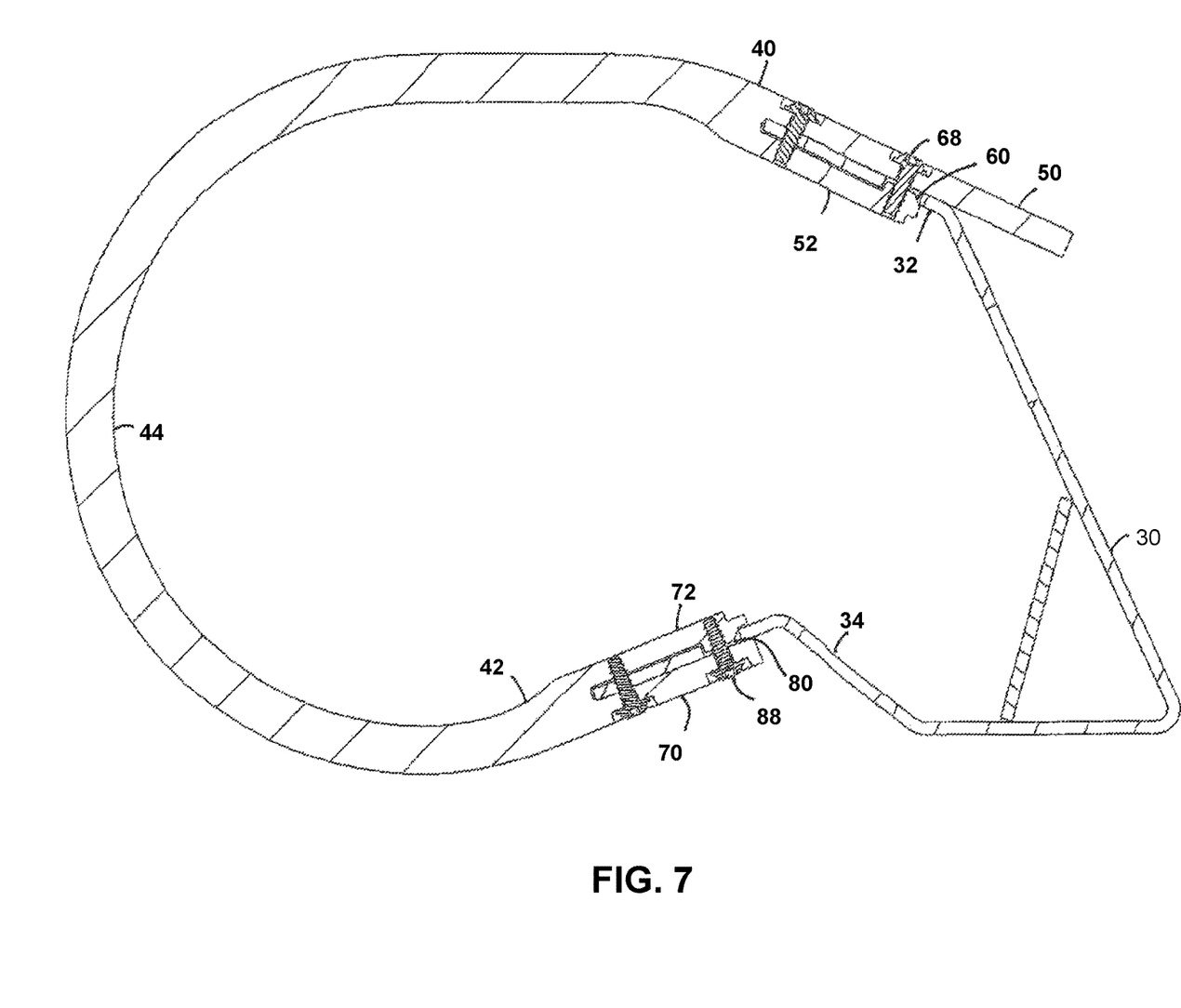
FIG. 7 is a cross section view of the stripper of FIG. 3.

Turning also now to FIGS. 5 and 6, a distal end of the upper leg 40 has an outer plate 50 separated from an inner plate 52 so as to form a gap G therebetween. In one embodiment, the outer plate 50 is longer than the inner plate 52, however, the plates 50, 52 could be of equal length or the inner plate 52 could be longer than the outer plate 50. Located centrally laterally in the upper leg 40 at a union 54 of the outer and inner plates 50, 52 and extending into the gap G is an alignment tab 56 (shown in phantom in FIG. 5). When the upper leg 40 is received on the upper stub 32, the tab 56 engages with the notch 36 in the upper stub 32. As shown, the outer and inner plates 50, 52 cantilever from the union 54 in the upper leg 40, however one skilled in the art may understand that the lateral edges of the outer and inner plates 50, 52 may connect so that the gap G is an enclosed cavity around the tab 56. An upper surface 58 of the inner plate 52 has a detent 60 extending upward into the gap. Located in each upper mounting stub 32 rearward of the notch 36 is a keyhole opening 62. When the upper leg 40 is slid onto the upper mounting stub 32 such that the tab 56 is received in the notch 36 to align the stripper 24, the detent 60 engages the keyhole opening 62 to help secure the stripper 24 in place. While the detent 60 is shown in the illustrated embodiment extending from the inner plate 52 in the illustrated embodiment, one skilled in the art will understand that the detent 60 may extend into the gap G from the outer plate 50, or that the detent may be on the upper mounting stub 32 and the key-hole opening 62 may be in one of the inner or outer plates 50, 52 without departing from the scope of the invention.

The outer plate 50 includes one or more clearance hole features 64 which have a corresponding pilot hole feature 66 in the inner plate 52 for self-tapping hardware 68 (FIG. 3). Alternatively, the hardware 68 and plates 50, 52 may include threaded inserts or other suitable fasteners in place of the self-tapping hardware and hole features. The upper legs 40 of each of the strippers 24 are mounted to a respective one of the upper mounting stubs 32 of the frame 30 by the mounting hardware 68 which are respectively inserted through the openings 64 in and screwed into the aligned pilot hole 66 such that flanged heads of the hardware 68 exert a clamping force which acts through the outer and inner plates 50, 52 to assist in forming a strong clamping joint between the stripper 24 and the mounting stub 32.

Similarly, a distal end of the lower leg 42 has an outer plate 70 separated from an inner plate 72 so as to form a gap G therebetween. Located centrally laterally in the lower leg 42 at a union 74 of the outer and inner plates 70, 72 and extending into the gap G is an alignment tab 76 (shown in phantom in FIG. 5). When the lower leg 42 is received on the lower stub 34, the tab 76 engages with the notch 38 in the lower stub 34. A lower surface 78 of the inner plate 72 has a detent 80 extending upward into the gap G. Located in each lower mounting stub 34 rearward of the notch 38 is a keyhole opening 82. When the lower leg 42 is slid onto the lower mounting stub 34 such that the tab 76 is received in the notch 38 to align the stripper 24, the detent 80 engages the keyhole opening 82 to help secure the stripper 24 in place. While the detent 80 is shown in the illustrated embodiment extending from the inner plate 72 in the illustrated embodiment, one skilled in the art will understand that the detent 80 may extend into the gap G from the outer plate 70, or that the detent 80 may be on the lower mounting stub 34 and the key-hole opening 82 may be in one of the inner or outer plates 70, 72 without departing from the scope of the invention. Hardware 88 may be used to secure the lower leg 42 to the lower mounting stub 34 as described above.

Figure 8:
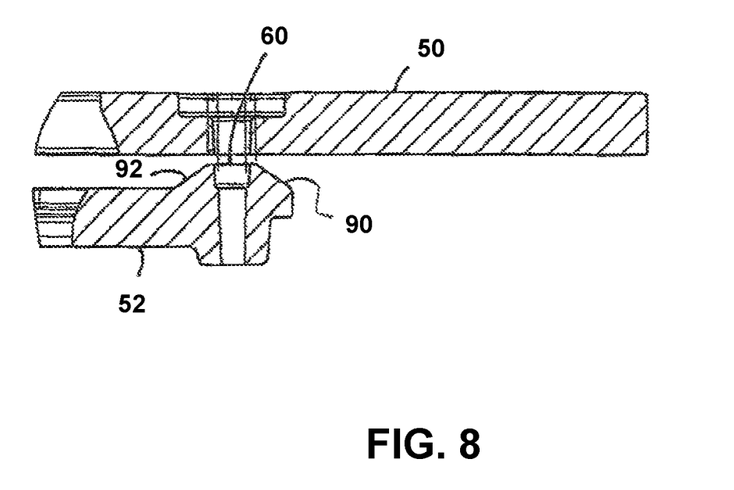

Turning now to FIG. 8, in one embodiment the geometry of detents 60 and 80 is such that a leading edge 90 and a trailing edge 92 of the detents 60, 80 are sloped/chamfered to improve assembly. When the assembler pushes the stripper rearward onto the corresponding leg of the pickup frame, the slope/chamfer causes the outer and inner plates to separate (longitudinally). Contrawise, when removing, a forward pulling force also causes the outer and inner plates to separate to ease removal.

The form-fitting attachment of the stripper 24 at its upper and lower legs 40, 42 significantly reduces the time required for mounting and removing the strippers 24 by reducing costly tapping, riveting, or welding operations to the pickup frame and provides a more positive engagement of the stripper 24 with the pickup frame 30.

The foregoing has broadly outlined some of the more pertinent aspects and features of the present invention. These should be construed to be merely illustrative of some of the more prominent features and applications of the invention. Other beneficial results can be obtained by applying the disclosed information in a different manner or by modifying the disclosed embodiments. Accordingly, other aspects and a more comprehensive understanding of the invention may be obtained by referring to the detailed description of the exemplary embodiments taken in conjunction with the accompanying drawings.

The invention claimed is:

1. A pickup assembly for an agricultural harvester, comprising:
a reel with a plurality of tines mounted at spaced locations along a length of the reel, the reel being rotatably supported by a harvester frame so that rotation of the reel causes cut crop material to be moved into the harvester by the pickup assembly;
a plurality of laterally spaced U-shaped crop strippers that loop at least partially around the reel, wherein each of the crop strippers are spaced from adjacent crop strippers such that the spacing between the adjacent crop strippers forms slots that allow one of the tines to project outwardly between the adjacent crop strippers and into operating engagement with the crop material, wherein each crop stripper includes a fore-and-aft extending upper leg and a fore-and-aft extending lower leg, with forward ends of the upper and lower legs joined by an arcuate front bight; and
a pickup frame rigidly connected to the harvester frame and extending over at least a portion of the length of the reel,
wherein the crop strippers are mounted on the pickup frame, the pick-up frame having a plurality of transversely spaced and forwardly extending upper mounting stubs and a plurality of transversely spaced and forwardly and downwardly extending lower mounting stubs,
wherein each of the upper mounting stubs has a notch located centrally in a forward end of the upper mounting stub,
wherein a rear end section of the upper leg of each of the crop strippers is engaged with a respective upper mounting stub of the pick-up frame and a rear end section of the lower leg is engaged with a respective lower mounting stub of the rear frame part,
wherein a distal end of each upper leg comprises an outer plate separated from an inner plate configured to form a gap therebetween, and located centrally laterally in the upper leg at a union of the outer and inner plates and extending into the gap, is an alignment tab such that when the upper leg is received on the upper stub, the tab engages with the notch in the upper stub, and
wherein a gap facing surface of one of the inner plate or the outer plate has a detent extending into the gap, and the upper mounting stub comprises a keyhole opening formed therein rearward of the notch, and when the upper leg is slid onto the upper mounting stub such that the alignment tab is received in the notch, the detent engages the keyhole opening to secure the crop stripper in place.

2. The pickup assembly of claim 1 wherein each of the lower mounting stubs has a notch located centrally in a forward end of the lower mounting stub, and wherein a distal end of the lower leg has an outer plate separated from an inner plate so as to form a gap therebetween, and located centrally laterally in the lower leg at a union of the outer and inner plates and extending into the gap is an alignment tab such that when the lower leg is received on the lower stub, the tab engages with the notch in the lower stub.

3. The pickup assembly of claim 2 wherein a lower surface of the inner plate of the lower leg comprises a detent extending upward into the gap.

4. The pickup assembly of claim 1 wherein the detent is in an upper surface of the inner plate and extends upward into the gap.

5. The pickup assembly of claim 4 wherein the outer plate includes at least one opening which has a corresponding pilot hole in the inner plate configured to receive self-tapping hardware.

6. The pickup assembly of claim 5 wherein the upper legs of each of the crop strippers are mounted to one respective upper mounting stub of the frame by the hardware which is inserted through the openings and screwed into the pilot hole aligned such that flanged heads of the hardware exert a clamping force which acts through the outer and inner plates to form a clamping joint between the crop stripper and the mounting stub.

7. The pickup assembly of claim 1 wherein the detent comprises a leading edge and a trailing edge which are chamfered such that when an assembler pushes the crop stripper rearward onto the corresponding leg of the pickup frame, the outer and inner plates separate.

8. The pickup assembly of claim 1 wherein the crop strippers are made of plastic material.

* * * * *